United States Patent
Rhee et al.

(10) Patent No.: US 9,003,240 B2
(45) Date of Patent: Apr. 7, 2015

(54) BLACKBOX MEMORY MONITORING WITH A CALLING CONTEXT MEMORY MAP AND SEMANTIC EXTRACTION

(71) Applicant: NEC Laboratories America, Inc., Princeton, NJ (US)

(72) Inventors: Junghwan Rhee, Princeton, NJ (US); Hui Zhang, Princeton Junction, NJ (US); Nipun Arora, Plainsboro, NJ (US); Guofei Jiang, Princeton, NJ (US); Kenji Yoshihira, Princeton Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 114 days.

(21) Appl. No.: 14/012,000

(22) Filed: Aug. 28, 2013

(65) Prior Publication Data

US 2014/0068351 A1    Mar. 6, 2014

Related U.S. Application Data

(60) Provisional application No. 61/694,012, filed on Aug. 28, 2012.

(51) Int. Cl.
| | |
|---|---|
| G06F 11/00 | (2006.01) |
| G06F 11/30 | (2006.01) |
| G06F 11/34 | (2006.01) |
| G06F 11/36 | (2006.01) |

(52) U.S. Cl.
CPC ........ *G06F 11/3034* (2013.01); *G06F 11/3051* (2013.01); *G06F 11/3476* (2013.01); *G06F 11/3037* (2013.01); *G06F 11/30* (2013.01); *G06F 11/3604* (2013.01); *G06F 11/3636* (2013.01)

(58) Field of Classification Search
CPC . G06F 11/30; G06F 11/3636; G06F 11/3037; G06F 11/3051; G06F 11/3476; G06F 11/3604
See application file for complete search history.

(56) References Cited

U.S. PATENT DOCUMENTS

| | | | |
|---|---|---|---|
| 7,904,493 B2* | 3/2011 | Schmelter et al. | 707/820 |
| 2005/0235127 A1* | 10/2005 | Muthiah et al. | 711/170 |
| 2007/0006047 A1* | 1/2007 | Zhou et al. | 714/38 |
| 2008/0222450 A1* | 9/2008 | Yang | 714/8 |
| 2009/0083363 A1* | 3/2009 | Kiciman et al. | 709/201 |
| 2009/0083714 A1* | 3/2009 | Kiciman et al. | 717/128 |
| 2011/0307828 A1* | 12/2011 | Chilimbi et al. | 715/802 |

* cited by examiner

*Primary Examiner* — Charles Ehne
(74) *Attorney, Agent, or Firm* — Joseph Kolodka

(57) ABSTRACT

A computer implemented method provides efficient monitoring and analysis of a program's memory objects in the operation stage. The invention can visualize and analyze a monitored program's data status with improved semantic information without requiring source code at runtime. The invention can provide higher quality of system management, performance debugging, and root-cause error analysis of enterprise software in the production stage.

17 Claims, 4 Drawing Sheets

(A) PROGRAM CODE
(B) CALLING CONTEXT TREE AND ENCODED CALLING CONTEXT ID VALUES (CCID)
(C) CALLING CONTEXT MEMORY MAP AND ROOT CAUSE ANALYSIS ns BLACKBOX MEMORY MONITORING WITH
A CALLING CONTEXT MEMORY MAP AND
SEMANTIC EXTRACTION

RELATED APPLICATION INFORMATION

This application claims priority to provisional application No. 61/694,012 filed Aug. 28, 2012, the contents thereof are incorporated herein by reference

BACKGROUND OF THE INVENTION

The present invention relates generally to software system performance diagnosis, and more particularly, to blackbox memory monitoring with a calling context memory map and semantic extraction.

Many software problems come from memory problems. Understanding the structure of memory objects is critical to determine the root-cause of memory errors. For example, knowing the memory address ranges and checking the overruns is an effective method to detect buffer overflow.

Also knowing the details of runtime memory status can help the management of software systems or performance debugging. For instance, by knowing the size of queues or the number of memory objects for transactions on the fly in the program, we can understand how busy the program is or whether there is any problem in the process workflow precisely based on the data status.

While there have been several approaches in the debugging stage (e.g., memory profiling), they are not directly applicable to the deployment stage due to the concern on performance.

With respect to how others have attempted to solve the problem, the following references are discussed below. [1] Nicholas Nethercote and Julian Seward, "Valgrind: A Framework for Heavyweight Dynamic Binary Instrumentation", In proceedings of ACM SIGPLAN 2007 Conference on Programming Language Design and Implementation (PLDI 2007), San Diego, Calif., USA, June 2007. [2] VisualVM: http://visualvm.java.net/features.html.

Valgrind [1] uses raw calling context (i.e., call stack information) extracted from the call stack at the allocation of memory objects to profile memory usages. This technique is called stack walking and it is generally expensive in terms of speed and storage. Walking call stack to extract the context is slow to perform at runtime. A representation of a call stack is a list of call sites with a varying size depending on the call depth. It makes the storage of context information inefficient.

VisualVM [2] is a visual tool to profile and analyze Java programs. It provides a memory profiler which presents the class names of live allocated objects. While the class names represent the identification of objects, this information is not enough to track back the root-cause understanding what code allocates this object.

Accordingly, there is a need for blackbox memory monitoring with a calling context memory map and semantic extraction.

BRIEF SUMMARY OF THE INVENTION

The invention is directed to a computer implemented method for memory monitoring of a program execution with a calling context memory map and semantic extraction that includes monitoring memory activities such as allocation and de-allocation of memory objects as a program is being executed by a calling context memory map generation, extracting by the monitoring allocated or de-allocated memory information from the program and calling context and recording memory related captured information into a memory object map called a calling context memory map, responsive to detected events during the step of monitoring memory activities, extracting semantic information from the memory object map, by a semantic extraction, and the memory map is augmented with the extracted information in a semantic annotated memory map, sending by a monitoring agent queries to a semantic annotated memory map for detecting memory anomalies such as memory leaks or detection of bloated memory; and changing memory monitoring policies responsive to query results or monitoring logic.

In a similar aspect of the invention there is provided a system for memory monitoring of a program execution with a calling context memory map and semantic extraction that includes a processor, code executable by the processor for monitoring memory activities such as allocation and de-allocation of memory objects as the program is being executed by an execution and calling context memory map generation, code executable by the processor for extracting by the monitoring allocated or de-allocated memory information from the program and calling context and recording memory related captured information into a memory object map called a calling context memory map, responsive to detected events during the monitoring of memory activities, code executable by the processor for extracting semantic information from the memory object map, by a semantic extraction and the memory map being augmented with the extracted information in a semantic annotated memory map, code executable by the processor for sending by a monitoring agent queries to a semantic annotated memory map for detecting memory anomalies such as memory leaks or detection of bloated memory, and code executable by the processor for changing memory monitoring policies responsive to query results or monitoring logic.

These and other advantages of the invention will be apparent to those of ordinary skill in the art by reference to the following detailed description and the accompanying drawings.

DETAILED DESCRIPTION

The present invention is directed to a solution to achieve efficient memory tracing of production systems. It solves several challenges using a combination of novel techniques.

This invention uses calling context information to provide in-depth understanding and root cause analysis of memory objects. In particular, we use encoded calling context to label memory objects and maintain them in an efficient memory map. Calling context information consists of a set of active functions and the number of such functions is nondeterministic depending on call context. Unlike such raw calling context information, the encoded call context has the fixed size; thus making the memory objects map efficient in terms of storage and speed.

Figures 1, 2:
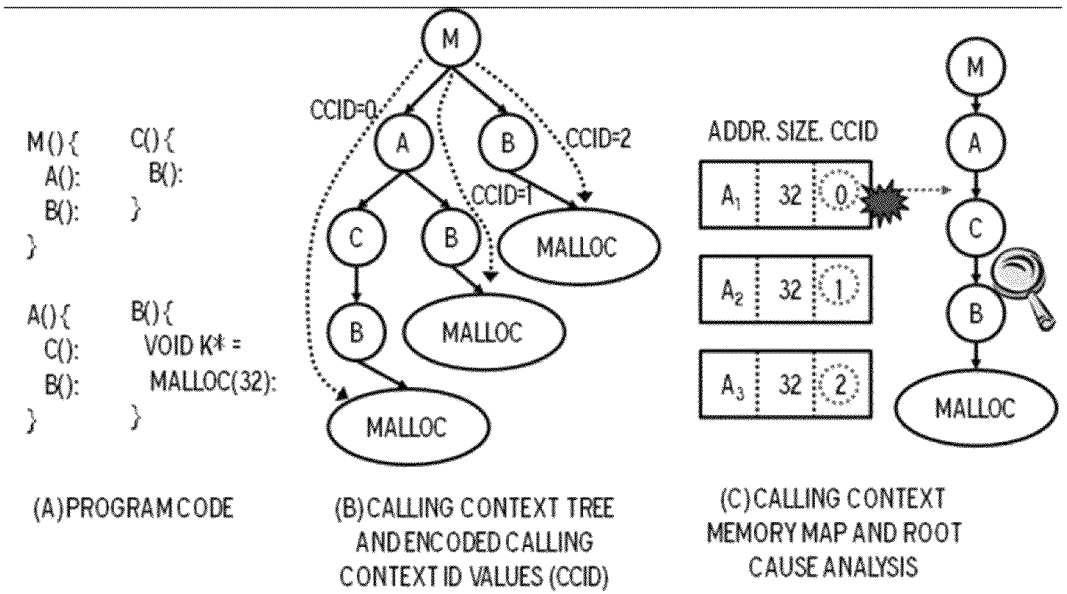
FIG. 1 is an diagram depicting labeling memory objects with encoded calling context identifiers (CCID), in accordance with the invention.
FIG. 2 is a diagram depicting extraction and aggregation of semantic information of memory objects, in accordance with the invention.

FIG. 1 illustrates the usage of the encoded calling context. FIG. 1(A) shows program code that allocates four memory objects. The distinct sequence of function calls that allocate the objects are presented in FIG. 1(B). Such variant sequences (e.g., M-A-C-B-Malloc, M-A-B-Malloc, and M-B-Malloc) represent different calling context and calling context encoding approaches encode them into concise integers such as 0, 1, or 2.

We propose to use this encoded calling context in a map of memory objects as shown in FIG. 1(C). When memory problems such as memory leak or performance anomaly is detected, this ID can is decoded into full calling context and locate the source of allocation so that the operator or developer can investigate the problem in the code.

During the process of root cause analysis, the source of the program may not be available or the operators do not have any domain knowledge on the monitored software. Users need to be able to select the objects of his interest for application monitoring. This requires the capability to visualize and understand inside the memory objects.

In order to solve this problem, we provide a technique that extracts the semantic information from memory objects. This technique enables the understanding of data by constructing data types from similar memory objects via data mining technology. Based on this information, operators or developers can choose a set of data objects of their interest and the monitoring can be more focused and efficient.

The output of semantic extraction can be highly accurate if we can cluster the objects of the similar kind. In black box approaches without source code, knowing the kind of memory objects efficiently is a highly challenging capability. This invention solves this problem by clustering objects by using the encoded calling context. The clustered objects are highly likely to be the same kind because they are allocated by the same code in the same context. This invention can cluster them without requiring any source code since we use CCID to label objects in the memory map. The clustered objects are scanned and the values of each field are analyzed using data mining techniques.

FIG. 2 illustrates this feature. In the left hand side, the objects in the memory map are shown. Note that each map entry includes the memory address range (i.e., starting address $A_k$ and the size 32) and their calling context ID (CCID). The output of semantic extraction is shown in the right hand side of FIG. 2. Semantic type 0 represents the extracted semantic information of the objects having the encoded calling context ID (CCID) 0. It shows the objects have four data field in common: an integer, a string with an invariant value, another string, and an integer which potentially can be used as identifiers.

Figure 3:
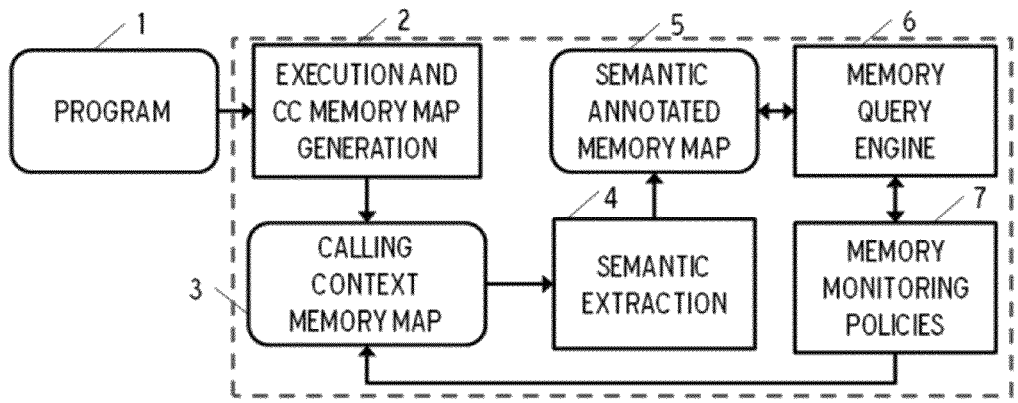
FIG. 3 is an overview diagram of the invention.

FIG. 3 shows the overview of this invention. Given the program (component 1), the execution of the program is monitored in particular regarding memory activities such as allocation and deallocation of memory objects (component 2). When such events are detected, the monitor extracts the allocated or deallocated memory information from the program and the calling context at the moments. The captured information is recorded into the memory object map (component 3). If source code is not available, the semantic information is extracted from memory objects (component 4) and the memory map is augmented with the extacted information (component 5).

In order to detect memory anomalies such as memory leaks or detection of bloated memory, the monitoring agent can send queries to the semantic annotated memory map (component 6). Based on the query results or monitoring logic, the memory monitoring policies can be changed (component 7). Also once operators select the kinds of memory objects of interest, they can set new policies to redefine the scope of memory monitoring. Such a change of in the monitoring scheme is illustrated as an arrow from the component 7 to the component 3.

In the following paragraphs, details of each component are presented. The following references are discussed. [3] Qiang Zeng, Dinghao Wu, and Peng Liu, "Cruiser: Concurrent Heap Buffer Overflow Monitoring Using Lock-free Data Structures", In proceedings of the 32nd ACM SIGPLAN Conference on Programming Language Design and Implementation (PLDI 2011). [4] W. N. Sumner, Y. Zheng, D. Weeratunge, and X. Zhang, "Precise Calling Context Encoding," *IEEE Transactions on Software Engineering*, pp. 525-534, 2011. [5] M. D. Bond and K. S. Mckinley, "Probabilistic calling context," *ACM SIGPLAN Notices*, 2007.

Figure 4:
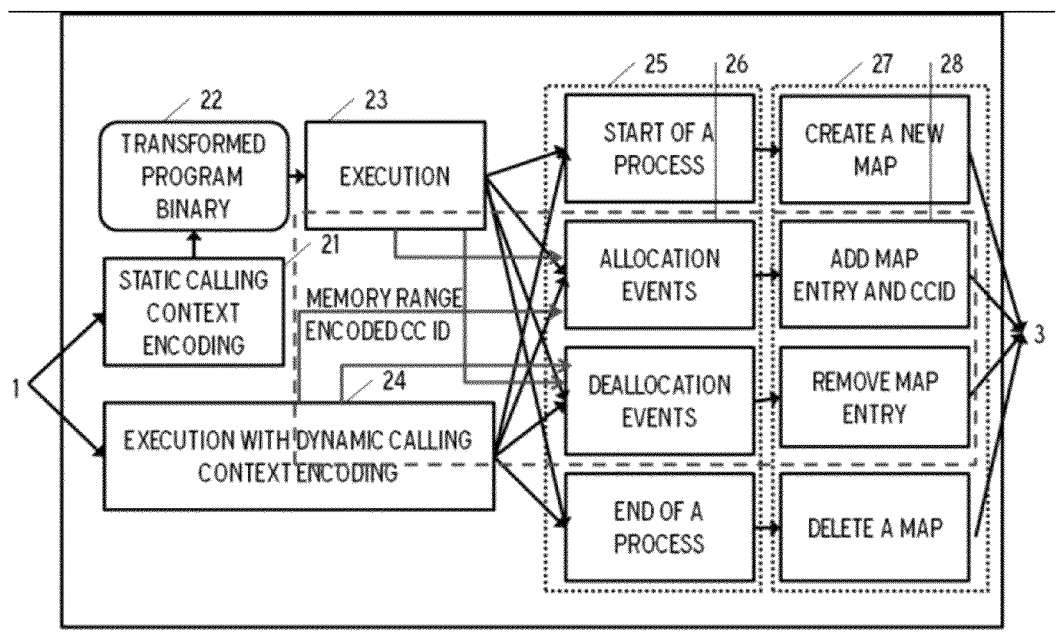
FIG. 4 is a diagram detailing execution and CC memory map generation, block 2, shown in FIG. 3, in accordance with the invention.

FIG. 4 illustrates how a memory map with calling context information is generated. Depending on the mechanism of calling context encoding, we present two usage scenarios. [4] proposes a calling context encoding mechanism that determines the encoding values statically in program analysis. Application of this method is shown as the components 21, 22, and 23. In this approach, the original program (component 1) is transformed into another version (component 22) with instrumented code that updates the calling context IDs (CCID) determined at static analysis (component 21). [5] proposes another calling context encoding approach which does not determine the encoding value beforehand. It can generate unique encoding values on the fly without requiring the availability of a program control graph. If this approach is applied, the calling context encoding will occur dynamically on the program's execution. This step is shown as the component 24.

Regardless which approach is used between static and dynamic approaches, the next steps are common. In order to generate a map of memory objects, the program's memory related operations should be captured. Such operations are presented as a dotted box 25 and the corresponding operations to manage memory maps are shown as a dotted box 27.

Each process has its own memory map. Therefore, when a new process is forked or a process is killed, the corresponding map is created or destroyed. When a new memory object is allocated or deallocated, such event is captured and the corresponding entry of the object is created in the map or removed from the map.

A difference from existing components is that we use calling context encoded values as identifiers of memory objects. The encoded calling context values are extracted from the program execution when the allocation events or deallocation events happen and they are stored in the memory object entries in the memory map. This operation is presented as the arrows from 23 and 24 to the component 3 going through the components 26 and 28. The next figure shows more details on this operation.

Figure 5:
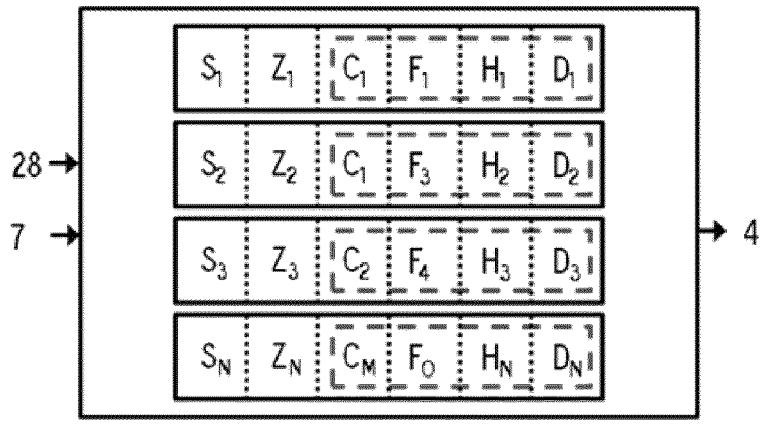
FIG. 5 is a diagram detailing calling context memory map, block 3, shown in FIG. 3, in accordance with the invention.

FIG. 5 presents how the information of memory objects are stored and managed in the memory map. Each memory object is represented as an N-tuple. This data structure records properties of each object. $S_N$ is the starting address of the object. $Z_N$ is the size of the object. $C_M$ and Fo are the encoded calling contexts at the object's allocation and deallocation. In addition, we have extra fields for detecting potential garbage objects. $H_N$ is the hash of content and $D_N$ is the dirty bit. Hash and dirty bit can indicate whether the objects have been modified. These values can be used to identify potential garbage objects by detecting the usage of objects.

With the introduction of the encoded calling context, each object in the memory map can be linked to the list of functions involved in its lifetime events (i.e., allocation and deallocation). Also other properties to check garbage objects will assist memory analysis such as memory bloating and memory leakage. We call this memory map extended with calling context and other information a calling context memory map (CC Map).

Regarding the low level mechanism to manage each memory object entry, various data structures can be used as candidates. One example is Software Cruising [3], which is a lock-free data structure that allows efficient scanning of memory at runtime.

Figure 6:
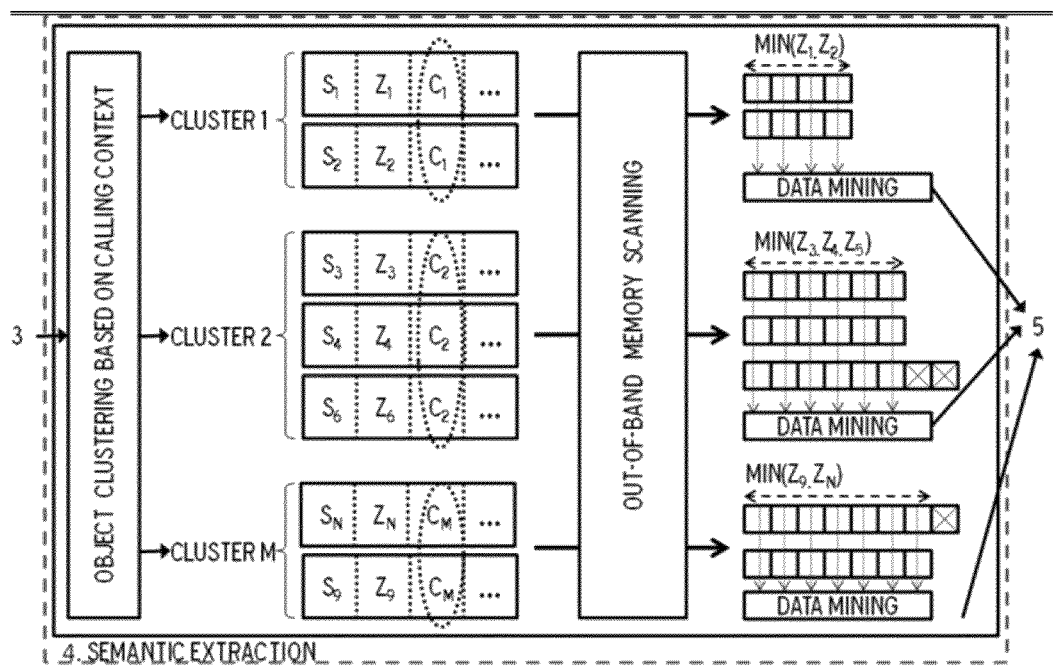
FIG. 6 is a diagram detailing semantic extraction, block 4, shown in FIG. 3, in accordance with the invention.

FIG. 6 presents how the captured memory objects are analyzed and summarized so that the users can understand their details. The purpose of this process to let users (e.g., develpers or operators) understand data objects without source code or a domain knowledge on the application so that they can select the data objects of their intereset for monitoring. We aim at blackbox monitoring which does not require the availability of source code of the monitored software. Essentially this process constructs a mapping between calling context and the data type. If the code is available, this mapping can be constructed by using source code analysis. This step needs to be done just once in a profiling stage or very infrequently in the deployment stage.

The memory objects in the map (component 3) are clustered based on their encoded calling context values. For each cluster, the memory values corresponding to the objects are collected and analyzed. Then the memory values are collected from the monitored process' memory. This operation can be done efficiently without slowing down the monitored process by using a dedicated monitoring thread different from the monitored program (out-of-band). One example is Software Cruising [3] that uses a separate thread and the lock-free data structure to read the memory values of the monitored process with addressing concurrency issues.

Depending on data types, the size of the allocated objects may be different if union or array types are used. We perform a normalization process to handle the objects uniformly. One simple method is to take the minimum of the sizes of the objects and crop objects with that size (shown as the MIN functions and crossed-out boxes). More advanced mechanism such as treating an array as a set of objects can be also used.

After the memory values of all objects are collected (shown as small boxes in the RHS of the Figure), the values of the common fields are analyzed by using data mining. This procedure compares the values that correspond to a field, and extract various information regarding the values of objects. This information is organized like a data type for each object and used to assist the operators' understanding of data. We call this information a data semantic type. It includes an offset of each field, the size of each field, potential data type or more descriptive data patterns, the usage flag, and the list of allocation and de-allocation encoded calling context values.

Figure 7:
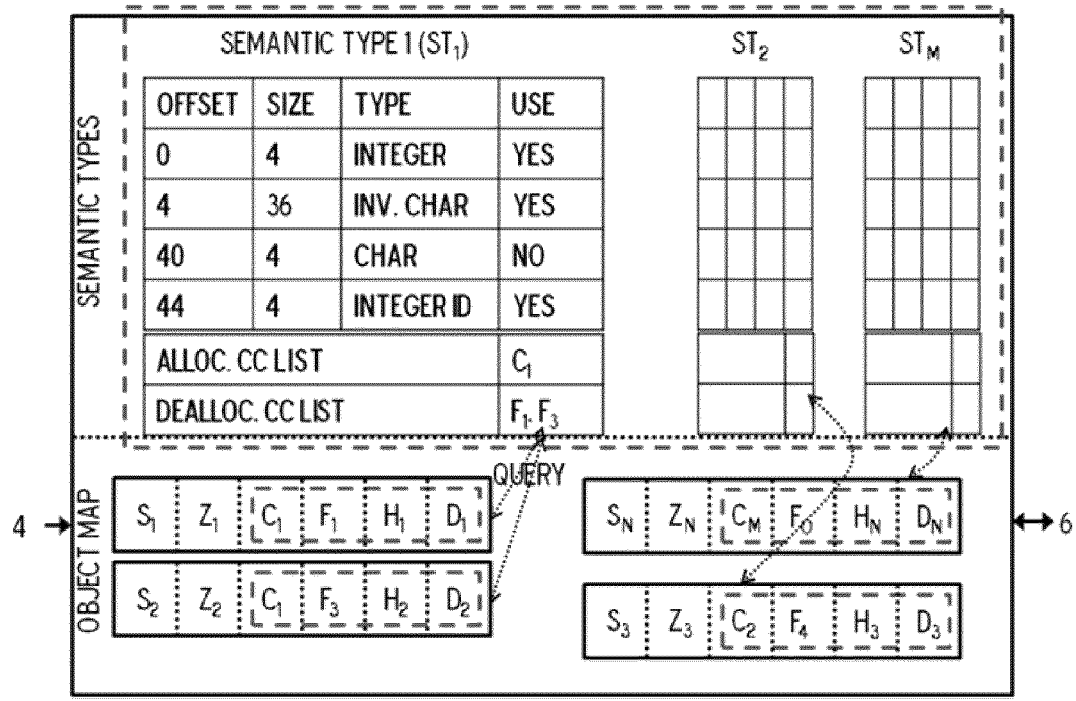
FIG. 7 is a diagram detailing semantic annotated memory map, block 5, shown in FIG. 3, in accordance with the invention.

The details of semantic types are shown in FIG. 7. The offset and size columns show each data field's location inside the object and its size. The type column has detailed information regarding the values including the data types (e.g., integer or char), any invariant of values (i.e., constant value), a range of values (e.g., [2, 10]), and data patterns (e.g., a series of numbers with the step of 1 from 0).

The usage flag lets users to select which field to be used or not used in the monitoring. If some field with dynamic data may not be in users' interest, it can be marked as not-used and excluded from monitoring for improved monitoring efficiency.

The encoded calling context of objects is aggregated into the allocation and deallocation calling context lists (ALLOC./DEALLOC. CC LISTS). In the example shown in FIG. 7, the semantic type 1 ($ST_1$) is constructed from two objects linked by the dotted arrows. These objects have the common allocation calling context $C_1$ and two different deallocation calling context $F_1$ and $F_3$. This information is summarized and listed in the ALLOC. CC LIST and DEALLC.CC LIST fields of the semantic type 1.

We call this calling context map augmented with the set of extracted semantic types a semantic annotated memory map. This map can support queries to retrieve semantic types and the memory objects of the types. For instance, given a memory object (having a starting address $S_1$), its semantic type (ST1) can be returned by using its encoded calling context value C1. When a user chooses a data type of interest, a reverse query can find its runtime instances. As one scenario, a user may want to examine the memory objects of a semantic type representing the application transactions. If the semantic type for transactions are determined, the reverse query can traverse the memory map and find all its memory instances.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 8:
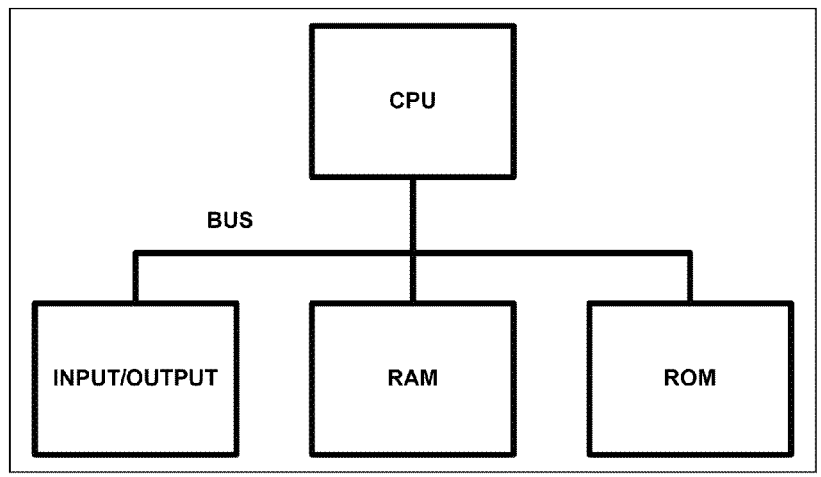
FIG. 8 shows an exemplary computer to perform the invention.

By way of example, a block diagram of a computer to perform the invention is discussed next in FIG. 8. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the present invention provides efficient monitoring and analysis of a program's memory objects in the operation stage. Specifically this invention can visualize and analyze a monitored program's data status with improved semantic information without requiring source code at runtime. Based on this technology, it can provide higher quality of system management, performance debugging, and root-cause error analysis of enterprise software in the production stage.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method for memory monitoring of a program execution with a calling context memory map and semantic extraction, comprising the steps of:
   monitoring memory activities such as allocation and de-allocation of memory objects as a program is being executed by a calling context memory map generation;
   extracting by said monitoring allocated or de-allocated memory information from the program and calling context and recording memory related captured information into a memory object map called a calling context memory map, responsive to detected events during said step of monitoring memory activities;
   extracting semantic information from the memory object map, by a semantic extraction and the memory map is augmented with the extracted information in a semantic annotated memory map;
   sending by a monitoring agent queries to a semantic annotated memory map for detecting memory anomalies such as memory leaks or detection of bloated memory; and
   changing memory monitoring policies responsive to query results or monitoring logic.

2. The method of claim 1, wherein said memory monitoring policies comprise that once types of memory objects of interest are selected, new policies are set to redefine scope of said monitoring of memory activities.

3. The computer implemented method of claim 1, wherein the calling context memory map generation comprises, depending on the mechanism of calling context encoding, two usage scenarios, the first scenario being a calling context encoding mechanism that determines the encoding values statically in program analysis with the first scenario approach entailing the original program being transformed into another version with instrumented code that updates calling context IDs (CCID) determined at static analysis, and the second scenario being another calling context encoding approach which does not determine the encoding value beforehand and can generate unique encoding values on the fly without requiring the availability of a program control graph, application of the second scenario is associated with the calling context encoding occurring dynamically on the program's execution.

4. The computer implemented method of claim 1, wherein the calling context memory map generation comprises that in order to generate a map of memory objects, the program's memory related operations should be captured with each process having its own memory map, and when a new process is forked or a process is killed, the corresponding map is created or destroyed, when a new memory object is allocated or de-allocated, such event is captured and the corresponding entry of the object is created in the map or removed from the map, and a difference from existing components entails use of calling context encoded values as identifiers of memory objects whose values are extracted from the program execution when the allocation events or de-allocation events happen and they are stored in the memory object entries in the memory map.

5. The computer implemented method of claim 1, wherein the calling context memory map comprises how information of memory objects is stored and managed in the memory map, each memory object being represented as an N-tuple data structure that records properties of each object with $S_N$ being a starting address of the object, $Z_N$ being a size of the object and $C_M$ and Fo being encoded calling contexts at the object's allocation and deallocation.

6. The computer implemented method of claim 1, wherein the calling context memory map comprises extra fields for detecting potential garbage objects with $H_N$ being a hash of content and $D_N$ being a dirty bit, the hash and dirty bit capable of indicating whether the objects have been modified and the hash and dirty bit values can be used to identify potential garbage objects by detecting the usage of objects.

7. The computer implemented method of claim 1, wherein the calling context memory map comprises an encoded calling context with each object in the memory map being linkable to a list of functions involved in its lifetime events, such as the allocation and de-allocation, and other properties to check garbage objects for assisting memory analysis such as memory bloating and memory leakage.

8. The computer implemented method of claim 1, wherein the sematic extraction comprises how the captured memory objects are analyzed and summarized so that the users can understand their details and let users understand data objects without source code or domain knowledge on the application so that they can select the data objects of their intereset for monitoring for the purpose of a blackbox monitoring which does not require the availability of source code of the monitored software in the program by constructing a mapping between calling context and the data type, wherein if the code for the program is available the mapping can be constructed by using source code analysis.

9. The computer implemented method of claim 1, wherein the semantic extraction comprises memory objects in the calling context memory map being clustered based on their encoded calling context values, for each cluster, the memory values corresponding to the objects being collected and analyzed and then the memory values being collected from the monitored process' memory which can be done without slowing down the monitored process by using a dedicated monitoring thread different from the monitored program.

10. The computer implemented method of claim 1, wherein the semantic extraction comprises that after the memory values of all objects are collected there is a comparing of values that correspond to a field, and various information regarding the values of objects are extracted, the extracted information being organized like a data type for each object and enabling an understanding of data.

11. The computer implemented method of claim 1, wherein the semantic annotated memory map comprises a map that can support queries to retrieve semantic types and the memory objects of the types.

12. A system for memory monitoring of a program execution with a calling context memory map and semantic extraction, comprising:
   a processor;
   code executable by the processor for monitoring memory activities such as allocation and de-allocation of memory objects as the program is being executed by an execution and calling context memory map generation;
   code executable by the processor for extracting by said monitoring allocated or de-allocated memory information from the program and calling context and recording memory related captured information into a memory object map called a calling context memory map, responsive to detected events during said step of monitoring memory activities;
   code executable by the processor for extracting semantic information from the memory object map by a semantic extraction and the memory map being augmented with the extracted information in a semantic annotated memory map;
   code executable by the processor for sending by a monitoring agent queries to a semantic annotated memory map for detecting memory anomalies such as memory leaks or detection of bloated memory; and
   code executable by the processor for changing memory monitoring policies responsive to query results or monitoring logic.

13. The system of claim 12, wherein the calling context memory map generation comprises, depending on the mechanism of calling context encoding, two usage scenarios, the first scenario being a calling context encoding mechanism that determines the encoding values statically in program analysis with the first scenario approach entailing the original program being transformed into another version with instrumented code that updates calling context IDs (CCID) determined at static analysis, and the second scenario being another calling context encoding approach which does not determine the encoding value beforehand and can generate unique encoding values on the fly without requiring the availability of a program control graph, application of the second scenario is associated with the calling context encoding occurring dynamically on the program's execution.

14. The system of claim 12, wherein the calling context memory map generation comprises that in order to generate a map of memory objects, the program's memory related operations should be captured with each process having its own memory map, and when a new process is forked or a process is killed, the corresponding map is created or destroyed, when a new memory object is allocated or de-allocated, such event is captured and the corresponding entry of the object is created in the map or removed from the map, and a difference from existing components entails use of calling context encoded values as identifiers of memory objects whose values are extracted from the program execution when the allocation events or de-allocation events happen and they are stored in the memory object entries in the memory map.

15. The system of claim 12, wherein the calling context memory map comprises how information of memory objects is stored and managed in the memory map, each memory object being represented as an N-tuple data structure that records properties of each object with $S_N$ being a starting address of the object, $Z_N$ being a size of the object and $C_M$ and $F_O$ being encoded calling contexts at the object's allocation and deallocation.

16. The system of claim 12, wherein the calling context memory map comprises extra fields for detecting potential garbage objects with $H_N$ being a hash of content and $D_N$ being a dirty bit, the hash and dirty bit capable of indicating whether the objects have been modified and the hash and dirty bit values can be used to identify potential garbage objects by detecting the usage of objects.

17. The system of claim 12, wherein the calling context memory map comprises an encoded calling context with each object in the memory map being linkable to a list of functions involved in its lifetime events, such as the allocation and de-allocation, and other properties to check garbage objects for assisting memory analysis such as memory bloating and memory leakage.

* * * * *